United States Patent
Naqi et al.

(10) Patent No.: US 9,493,063 B2
(45) Date of Patent: Nov. 15, 2016

(54) METHOD TO ALLOW TRICKLE-CHARGING ON A STRONG HYBRID VEHICLE TO BALANCE ACCESSORY LOADS

(71) Applicant: GM GLOBAL TECHNOLOGY OPERATIONS LLC, Detroit, MI (US)

(72) Inventors: Syed Naqi, Dearborn, MI (US); Shaun C. Bowman, Ann Arbor, MI (US); Anthony H. Heap, Ann Arbor, MI (US); Sean W McGrogan, Ann Arbor, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 212 days.

(21) Appl. No.: 14/333,337

(22) Filed: Jul. 16, 2014

(65) Prior Publication Data
US 2016/0016579 A1    Jan. 21, 2016

(51) Int. Cl.
| | |
|---|---|
| *B60W 10/08* | (2006.01) |
| *B60K 6/445* | (2007.10) |
| *B60W 10/06* | (2006.01) |
| *B60W 10/115* | (2012.01) |
| *B60W 10/26* | (2006.01) |

(Continued)

(52) U.S. Cl.
CPC ............ *B60K 6/445* (2013.01); *B60W 10/06* (2013.01); *B60W 10/08* (2013.01); *B60W 10/115* (2013.01); *B60W 10/26* (2013.01); *B60W 20/106* (2013.01); *B60W 30/18054* (2013.01); *F16H 3/728* (2013.01); *F16H 61/20* (2013.01); *F16H 2037/0873* (2013.01); *F16H 2037/102* (2013.01); *F16H 2200/2007* (2013.01); *F16H 2200/2035* (2013.01); *Y02T 10/6239* (2013.01); *Y02T 10/6286* (2013.01); *Y10S 903/93* (2013.01)

(58) Field of Classification Search
CPC .................. B60W 10/08; B60W 10/26; B60W 10/115; B60W 20/106; F16H 2059/145; Y10T 477/23; Y10T 477/26; Y10T 477/27; Y10T 477/32; Y10T 477/33
See application file for complete search history.

(56) References Cited

U.S. PATENT DOCUMENTS

| | | | |
|---|---|---|---|
| 5,914,575 A * | 6/1999 | Sasaki | B60K 6/52 180/65.235 |
| 2012/0226406 A1* | 9/2012 | Kaita | B60K 6/445 701/22 |

(Continued)

*Primary Examiner* — Huan Le (57) ABSTRACT

A control-module implemented method for controlling a powertrain system comprising an internal combustion engine, at least one electric machine, a high-voltage battery and an electro-mechanical transmission operative to transmit torque to a driveline includes monitoring a state of charge (SOC) of a high-voltage battery configured to provide stored electrical power to a first electric machine, a second electric machine and at least one auxiliary load. A trickle-charging event is enabled only when the SOC of the high-voltage battery is less than a first SOC threshold. The trickle-charging event activates the first clutch coupled to a first planetary gear set. The trickle-charging event further coordinates a torque capacity of the activated first clutch and a charging set of torque commands between the engine, the first electric machine and the second electric machine to establish a net zero output torque condition.

20 Claims, 3 Drawing Sheets

(51) Int. Cl.
   *B60W 20/00*    (2016.01)
   *B60W 30/18*    (2012.01)
   *F16H 61/20*    (2006.01)
   *F16H 3/72*     (2006.01)
   *F16H 37/08*        (2006.01)
   *F16H 37/10*        (2006.01)

(56) References Cited

U.S. PATENT DOCUMENTS

2013/0124025 A1\* 5/2013 Janczak .............. B60W 20/106
                                                        701/22
2014/0011632 A1\* 1/2014 Ito ......................... B60W 10/11
                                                         477/5

\* cited by examiner

METHOD TO ALLOW TRICKLE-CHARGING ON A STRONG HYBRID VEHICLE TO BALANCE ACCESSORY LOADS

TECHNICAL FIELD

This disclosure is related to powertrain systems employing multiple torque-generative devices, and dynamic system controls associated therewith.

BACKGROUND

The statements in this section merely provide background information related to the present disclosure. Accordingly, such statements are not intended to constitute an admission of prior art.

Powertrain systems may be configured to transfer torque originating from multiple torque-generative devices through a torque transmission device to an output member that may be coupled to a driveline. Such powertrain systems include hybrid powertrain systems and extended-range electric vehicle systems. Control systems for operating such powertrain systems operate the torque-generative devices and apply torque transfer elements in the transmission to transfer torque in response to operator-commanded output torque requests, taking into account fuel economy, emissions, drivability, and other factors. Exemplary torque-generative devices include internal combustion engines and non-combustion torque machines. The non-combustion torque machines may include electric machines that are operative as motors or generators to generate a torque input to the transmission independently of a torque input from the internal combustion engine. The torque machines may transform vehicle kinetic energy transferred through the vehicle driveline to electrical energy that is storable in an electrical energy storage device in what is referred to as a regenerative operation. A control system monitors various inputs from the vehicle and the operator and provides operational control of the hybrid powertrain, including controlling transmission operating state and gear shifting, controlling the torque-generative devices, and regulating the electrical power interchange among the electrical energy storage device and the electric machines to manage outputs of the transmission, including torque and rotational speed.

It is known, for example, to require an electrical energy storage device in a hybrid powertrain to sustain electrical loads during operation in neutral. These electrical loads can include auxiliary loads such as an air conditioner or entertainment system of the vehicle. One drawback can be an inability to charge the electrical energy storage device during operation in neutral using torque provided from the engine when the powertrain lacks a mechanical disconnect from a driveline. In some instances, the vehicle can be required to operate in neutral for extended periods of time, such as when the vehicle is in a car wash. Accordingly, when the state of charge of the electrical energy storage device depletes from sustaining these electrical loads during operation in neutral for an extended period of time, the hybrid powertrain can be commanded to shut down.

SUMMARY

A control-module implemented method for controlling a powertrain system comprising an internal combustion engine, at least one electric machine, a high-voltage battery and an electro-mechanical transmission operative to transmit torque to a driveline includes monitoring a state of charge (SOC) of a high-voltage battery configured to provide stored electrical power to a first electric machine, a second electric machine and at least one auxiliary load. A trickle-charging event is enabled only when the SOC of the high-voltage battery is less than a first SOC threshold. The trickle-charging event activates the first clutch coupled to a first planetary gear set. The trickle-charging event further coordinates a torque capacity of the activated first clutch and a charging set of torque commands between the engine, the first electric machine and the second electric machine to establish a net zero output torque condition.

BRIEF DESCRIPTION OF THE DRAWINGS

One or more embodiments will now be described, by way of example, with reference to the accompanying drawings, in which:

FIGS. 2-1, 2-2 and 2-3 illustrate lever diagrams including a portion of a transmission for the powertrain system illustrated in FIG. 1 when neutral operation of the transmission is enabled in response to an operator input, in accordance with the present disclosure.

DETAILED DESCRIPTION

Figure 1:
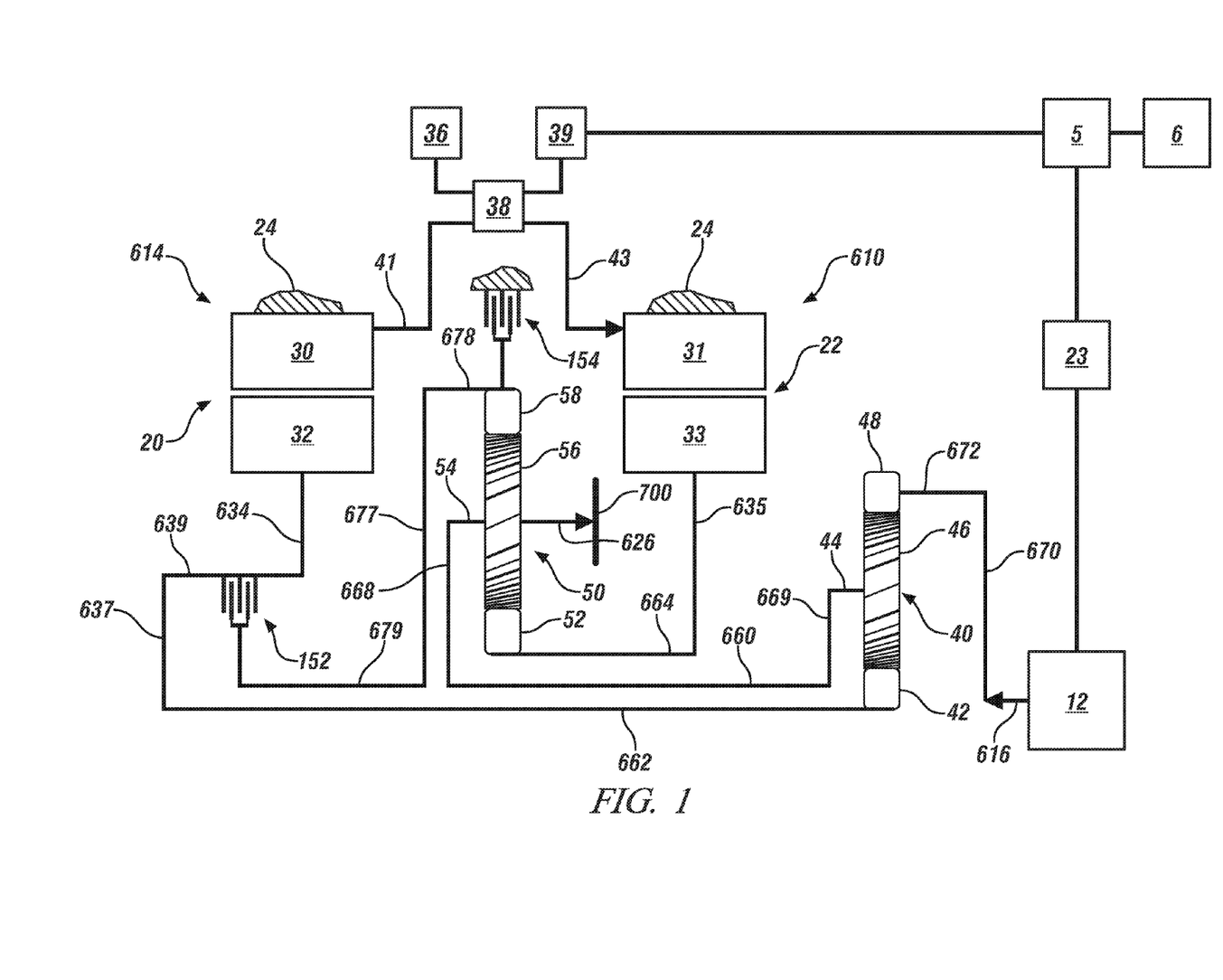
FIG. 1 illustrates a powertrain system having an internal combustion engine drivingly connected with a electro-mechanical transmission, a driveline, and a controller, in accordance with the present disclosure.

Referring now to the drawings, wherein the showings are for the purpose of illustrating certain exemplary embodiments only and not for the purpose of limiting the same, FIG. 1 illustrates a powertrain 610 having an internal combustion engine 12 drivingly connected with a electro-mechanical transmission 614. An output member of the engine 12 is connected for driving an input member 616 of the transmission 614.

A first electric machine 20 and a second electric machine 22 are packaged within a case housing/ground 24 and are operatively connected between the input member 616 and a transmission output member 626 that reacts with a driveline 700. The first electric machine 20 includes an annular stator 30 grounded to the transmission casing 24, an annular rotor 32 supported on and for rotation with a rotatable rotor hub 634. A high-voltage electrical energy storage device, e.g., a battery 36, power inverter 38 and electronic controller 39 are operatively connected with the stator 30 via transfer conductor 41 to control the functioning of the first electric machine 20 as a motor in which stored electrical energy is provided by the battery 36 to the stator 30 or the electrical energy can be sourced through the road when the second electric machine 22 is acting as a generator, and a generator in which torque of the rotating rotor 32 is converted to electrical power stored in the battery 36 or used by the second electric machine 22.

Similarly, the second electric machine 22 includes an annular stator 31 grounded to the transmission casing 24, an annular rotor 33 supported on a rotatable rotor rub 635. The battery 36, power inverter 38 and electronic controller 39 are operatively connected with the stator 31 via transfer conductor 43 to control the functioning of the second electric machine 22 as a motor and a generator.

The transmission 614 further includes first and second planetary gear sets 40, 50, respectively. Planetary gear set 40 has a first member that is a sun gear 42, a second member that is a carrier member 44 that rotatably supports a plurality of pinion gears 46 meshing with the sun gear 42, and a third member that is a ring gear 48 meshing with the pinion gears 46.

Planetary gear set 50 has a first member which is a sun gear 52, a second member that is a carrier member 54 that rotatably supports a plurality of pinion gears 56 meshing with the sun gear 52, and a third member that is a ring gear 58 meshing with the pinion gears 56. Rotor hub 635 is connected for rotation with the sun gear 52 by intermediate sleeve shaft 664.

The transmission 614 includes a first clutch 154 and a second clutch 152. The first clutch 154, also referred to as a grounding clutch or brake, is selectively activated to ground the ring gear member 58 to the transmission casing 24. The input member 616 is axially spaced from and not concentric with shaft 660, which couples the carrier member 44 of the first planetary gear set 40 and the carrier member 54 of the second planetary gear set 50. Shaft 672 is coaxial with the input member 616. Input member 616 couples to hub member 670 and axially-extending portion 672 to couple the input member 616 for common rotation with the ring gear 48. Shaft 662 couples rotor hub 634 with sun gear 42 via hub member 637 and an axially-extending portion 639. The second clutch 152 is nested between an axially extending portion 639, the hub 634 and the hub member 637. A hub member 677 is connected with the second clutch 152. A separate sleeve shaft 660 concentric with shaft 662 couples carrier member 54 and hub member 668 and 669 to carrier member 44. Sleeve shaft 664 couples rotor hub 635 with sun gear 52. Axially-extending member 678, hub 677 and axially-extending member 679, which is an annular shaft, couples the second clutch 152 with the first clutch 154 and ring gear 58. Axial-extending member 678 circumscribes the planetary gear set 50. It will be appreciated that the ring gear member 58 is decoupled from the sun gear member 42 when the second clutch 152 is deactivated. Likewise, when the second clutch 152 is activated, the ring gear member 58 is coupled to the sun gear member 42.

An engine control module (ECM) 23 is operatively connected to the engine 12, and functions to acquire data from sensors and control actuators of the engine 12 over a plurality of discrete lines. The ECM 23 monitors an actual engine input torque, $T_I$, provided to the transmission 614 at that point in time based upon monitored engine speed and load, which is communicated to a hybrid control module (HCP) 5. The electronic controller 39 monitors a first motor torque of the first electric machine 20 and a second motor torque of the second electric machine 22. Alternatively, two electronic controllers can be utilized, each controller monitoring respective ones of the first and second electric machines 20, 22, respectively. The HCP 5 provides supervisory control over the ECM 23 and the electronic controller 39 and a gear selector lever 6 which is operatively connected to receive inputs from a vehicle operator. The HCP 5 can further control activation and deactivation of the first and second clutches 154, 152, respectively.

The exemplary transmission 614 lacks a mechanical disconnect from the driveline 700 to establish a true neutral condition when a neutral operation of the transmission 614 is requested in response to an operator input to the gear selector lever 6. Accordingly, the HCP 5 may establish a net zero output torque condition, wherein the operator of the vehicle perceives neutral operation of the transmission despite the lack of the mechanical disconnect between the output member 626 and the driveline 700. When charging of the battery 36 is not required, establishing the net zero output torque condition includes the HCP 5 deactivating the first and second clutches 154, 152, respectively, and coordinating a first set of torque commands among the engine 12 and the first and second electric machines 20, 22, respectively. When charging the battery 36 is required, establishing the net zero output torque condition includes the HCP 5 activating the first clutch 154, deactivating the second clutch 152, coordinating a torque capacity of the activated first clutch 152 and a second set of torque commands between the engine 12, and the first and second electric machines 20, 22, respectively. As used herein, the first set of torque commands can be referred to as a non-charging set of torque commands and the second set of torque commands can be referred to as a charging set of torque commands. It will be appreciated during operation of the transmission in neutral, operation of one or more auxiliary loads supplied with electrical energy from the battery 36 may deplete a state of charge (SOC) of the battery 36, wherein the transmission is incapable of charging the battery during the net zero output torque condition when in the presence of the deactivated first clutch 154. Exemplary embodiments herein are directed toward the HCP 5 enabling a trickle-charging event only when the battery SOC depletes below a SOC threshold (e.g., first SOC threshold) during operation of the transmission in neutral while the engine is ON and the first clutch 154 is deactivated. During the trickle-charging event, torque commands among the engine 12 and the first and second electric machines 20, 22, respectively, are coordinated in conjunction with a reactive torque from the first clutch 154 when activated, to provide the ability to charge the battery 36 using torque provided by the engine 12 through the first electric machine 20 while maintaining the net output torque condition. It will be appreciated that enabling the trickle-charging event eliminates or reduces the possibility of a shutdown of the powertrain system 610 when the battery SOC becomes too low.

Control module, module, control, controller, control unit, processor and similar terms mean any one or various combinations of one or more of Application Specific Integrated Circuit(s) (ASIC), electronic circuit(s), central processing unit(s) (preferably microprocessor(s)) and associated memory and storage (read only, programmable read only, random access, hard drive, etc.) executing one or more software or firmware programs or routines, combinational logic circuit(s), input/output circuit(s) and devices, appropriate signal conditioning and buffer circuitry, and other components to provide the described functionality. Software, firmware, programs, instructions, routines, code, algorithms and similar terms mean any instruction sets including calibrations and look-up tables. The control module has a set of control routines executed to provide the desired functions. Routines are executed, such as by a central processing unit, and are operable to monitor inputs from sensing devices and other networked control modules, and execute control and diagnostic routines to control operation of actuators. Routines may be executed at regular intervals, for example each 3.125, 6.25, 12.5, 25 and 100 milliseconds during ongoing engine and vehicle operation. Alternatively, routines may be executed in response to occurrence of an event.

Figure 21:
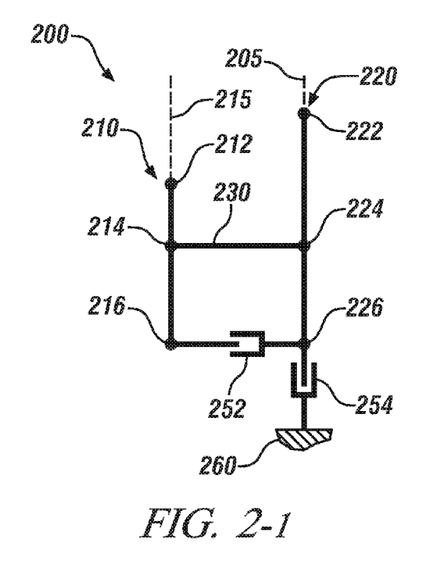

FIG. 2-1 is an embodiment of a lever diagram for the powertrain system 610 illustrated in FIG. 1 including a portion of the transmission 200 that is configured to transfer torque between an internal combustion engine, first and second electric machines and an output member coupled to a driveline of a vehicle. The transmission 200 includes first and second planetary gear sets 220, 210, respectively, a first clutch 254, a second clutch 252 and a case ground 260. In an exemplary embodiment with reference to FIG. 1, the first planetary gear set 220 corresponds to the second planetary gear set 50, the second planetary gear set 210 corresponds to the first planetary gear set 40, the first clutch 254 corresponds to the first clutch 154 and the second clutch 252 corresponds to the second clutch 152 and the case ground 260 corresponds to the transmission casing 24.

The second planetary gear set 210 includes a first element 216, a second element 214 and a third element 212. The first element 216 is coupled to a first electric machine and coupled to one element of the second clutch 252. The second element is coupled to a rotating shaft 230 and the third element 212 is coupled to an engine. In the illustrated embodiment with reference to FIG. 1, the first element 216 corresponds to the sun gear 42, the second element 214 corresponds to the carrier member 44, the third element 212 corresponds to the ring gear 48, the first electric machine corresponds to the first electric machine 20, the rotating shaft 230 corresponds to shaft 660 and the engine corresponds to the internal combustion engine 12.

Similarly, the first planetary gear set 220 includes a first element 226, a second element 224 and a third element 222. The first element 226 is coupled to the other element of the second clutch 252 and coupled to one element of the first clutch 254. Hence, the first element 226 is coupled to the first electric machine when the second clutch 252 is activated and decoupled from the first electric machine when the second clutch 252 is deactivated. The second element 224 is coupled to the rotating shaft and an output member to a driveline. The third element 222 is coupled to the second electric machine. The other element of the first clutch 254 is coupled to the case ground 260. Hence, the first clutch 254 is a grounding clutch configured to ground the first element 226 of the first planetary gear set 220 when the first clutch 254 is activated. In the illustrated embodiment with reference to FIG. 1, the first element 226 corresponds to the ring gear 58, the second element 224 corresponds to the carrier member 54, the third element 222 corresponds to the sun gear 52, the second electric machine corresponds to the second electric machine 22, the output member corresponds to the output member 626 and the driveline corresponds to the driveline 700.

Rotational speeds of elements of the first planetary gear set 220 are shown in relation to a first vertical axis 205 and rotational speeds of elements of the second planetary gear set 210 are shown in relation to a second vertical axis 215. The horizontal positions of the aforementioned elements of the first and second planetary gear sets 220, 210, respectively, indicate rotational speeds thereof. As shown, the powertrain system is not operating and the rotational speeds of all the elements are zero, as indicated by their horizontal orientations relative to the first and second axes 205, 215, respectively.

Figure 22:
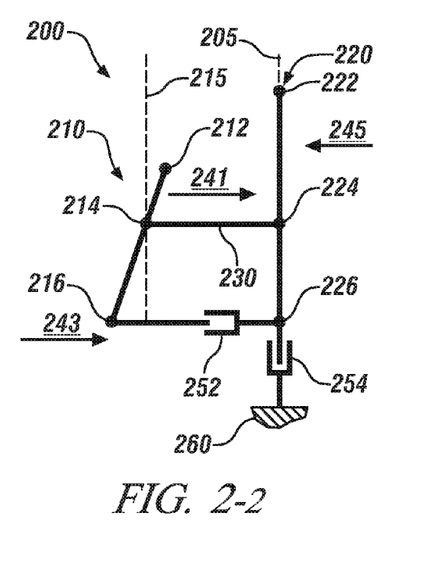

FIG. 2-2 depicts the transmission 200 operating in neutral. Enabling neutral operation of the transmission 200 can be in response to an operator input to a gear selector lever, e.g., an operator selecting neutral on a PRNDL lever. The transmission 200 lacks a mechanical disconnect from the driveline. In other words, the transmission 200 is operating in neutral without mechanically decoupling the output member from the driveline. In the illustrated embodiment, the engine is ON, fueled and spinning A net zero output torque from the transmission 200 to the driveline is established by balancing an engine input torque 241 provided to the transmission, a first motor torque 243 from the first electric machine and a second motor torque 245 from the second electric machine. The exemplary engine input torque 241, the first motor torque 243 and the second motor torque 245 are indicative of the first set of torque commands (e.g., non-charging set of torque commands). The first and second clutches 254, 252, respectively, are both deactivated. In the illustrated embodiment, generation of electrical energy through the first electric machine for storage within a high-voltage battery (e.g., battery 36) is not provided upon presence of the deactivated first clutch 254 when the first element 226 of the first planetary gear set 220 is ungrounded. Accordingly, operating auxiliary loads supplied with electrical energy from the battery can deplete the battery SOC when the transmission is operating in the net zero output torque condition of the illustrated embodiment of FIG. 2-2.

Figure 23:
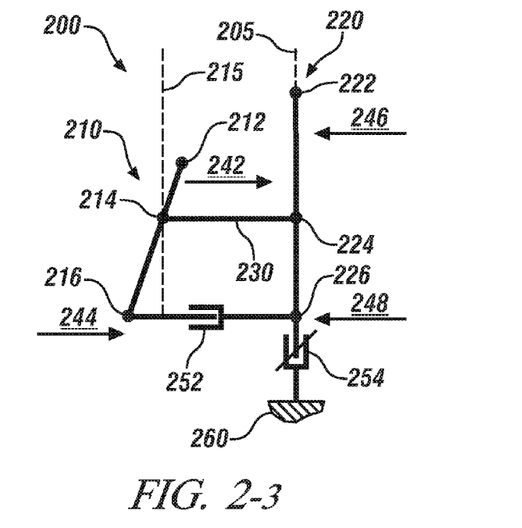

FIG. 2-3 depicts the transmission 200 operating in neutral when a trickle-charging event is enabled. The trickle-charging event can be enabled by the hybrid control module 5 when the battery SOC depletes below a first SOC threshold during operation of the transmission in neutral while the engine is on, fueled and spinning. In the illustrated embodiment, the transmission 200 is also operating in neutral without mechanically decoupling the output member from the driveline; however, the first clutch 254 is now activated during the enabled trickle-charging event. Here, reactive torque 248 provided by the activated first clutch 254, engine torque 242, i.e., engine input torque provided to the transmission 200, a first motor torque 244 from the first electric machine and a second motor torque 246 from the second electric machine are balanced to establish the net zero output torque condition from the transmission 200 to the driveline. The exemplary engine input torque 242, the first motor torque 244 and the second motor torque 246 are indicative of the second set of torque commands (e.g., charging set of torque commands). It will be appreciated that the activated first clutch 254 has a torque capacity sufficient for providing the required reactive torque 248, and thus, assists in establishing the net zero output torque from the transmission 200 to the driveline while enabling generation of electrical energy through said first electric machine for storage within the high-voltage battery upon presence of the activated first clutch 254. Specifically, the engine torque 242 is a positive engine torque that supports engine operation at a minimum engine speed associated with engine idle operation while enabling the generation of electrical energy through said first electric machine for storage within the battery upon presence of the activated first clutch 254. The first motor torque 244 is positive and the second motor torque 246 is a reactive negative torque. Moreover, the second clutch 252 remains deactivated, wherein the first electric machine is decoupled from the first element 226 of the first planetary gear set 220. In a non-limiting example, the engine torque 242 is 20 Nm, the first motor torque 244 is 11 Nm, the second motor torque 246 is −10 Nm and the reactive torque 248 provided by the first clutch 254 is −21 Nm to establish the net zero output torque condition or net zero output torque from the transmission to the driveline while providing the ability to charge the battery when the battery SOC depletes to a value less than the SOC threshold. One or more of the exemplary torques 242, 244, 246 of FIG. 2-3 (e.g., second set of torque commands) may be different than the exemplary torques 241, 243, 245 of FIG. 2-2 (e.g., first set of torque commands) for establishing the net zero output torque condition.

Figure 3:
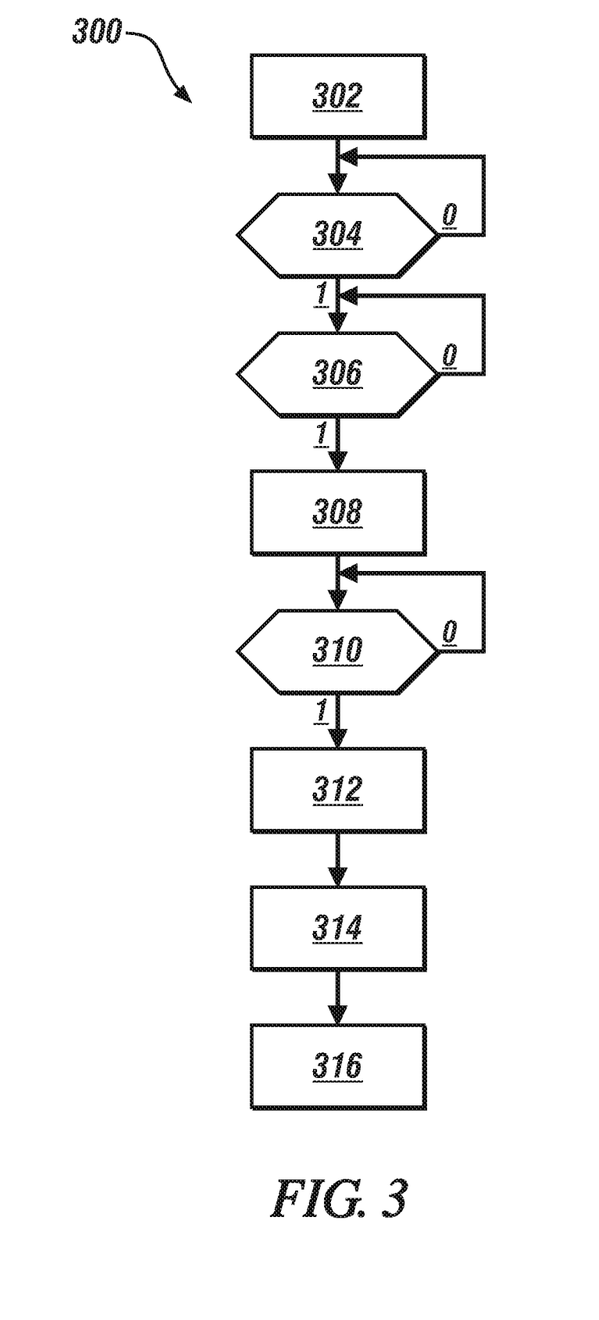
FIG. 3 illustrates a flow chart for enabling generation of electrical energy through an electric machine for storage within a high-voltage battery during operation of an exemplary electro-mechanical transmission in neutral, in accordance with the present disclosure.

In an exemplary embodiment with reference to FIGS. 1, 2-1, 2-3 and 2-3, FIG. 3 illustrates a flow chart 300 for a routine for enabling generation of electrical energy through an electric machine for storage within a high-voltage battery during operation of an exemplary electro-mechanical transmission in neutral, in accordance with the present disclosure. It will be appreciated that the exemplary routine can be implemented within, and executed by, the HCP 5 illustrated in FIG. 1. Table 1 is provided as a key to FIG. 3, wherein the numerically labeled blocks and the corresponding functions are set forth as follows.

TABLE 1

| BLOCK | BLOCK CONTENTS |
|---|---|
| 302 | Start. |
| 304 | Is neutral operation of transmission selected? |
| 306 | Is engine ON and is a first clutch deactivated to unground an element of the first planetary gear set? |
| 308 | Monitoring a battery SOC. |
| 310 | Is the monitored battery SOC less than a first SOC threshold? |
| 312 | Enabling a trickle-charging event when the monitored battery SOC is less than the first SOC threshold. |
| 314 | Activating the first clutch configured to ground the element of the first planetary gear set and deactivating a second clutch configured to decouple the element of the first planetary gear set from an element of a second planetary gear set. |
| 316 | Coordinating a torque capacity of the activated first clutch and a charging set of torque commands between an engine, first electric machine and second electric machine to establish a net zero output torque condition. |

The flow chart 300 starts at block 302, and decision block 304 determines if operation of the transmission is in neutral. Operation of the transmission in neutral can be in response to an operator input. In one embodiment, the HCP 5 monitors an operator input to a gear selector lever 6, e.g., a PRNDL lever. A "0" denotes that the transmission is not operating in neutral, and the flow chart 300 reverts back to decision block 304. A "1" denotes that the transmission is operating in neutral, and the flow chart 300 proceeds to decision block 306. As aforementioned, neutral operation of the transmission 614 is provided without mechanically decoupling the transmission 614 from the driveline 700. Accordingly, a first set (e.g., non-charging set) of torque commands among each of the engine and the first and second electric machines can be balanced to establish a net zero output torque from the transmission to the driveline.

Referring to decision block 306, it is determined whether the engine is ON and a first clutch coupled to a first planetary gear set is deactivated. When the engine is ON, the engine is fueled and spinning. The exemplary first planetary gear set 220 includes the first element 226, the second element 224 and the third element 222. The first clutch 254 is a grounding clutch configured to unground the first element 226 of the first planetary gear set 220 when the first clutch 254 is deactivated, the second element 224 of the first planetary gear set 220 is coupled to an output member (e.g., output member 626) that reacts with the driveline (e.g., driveline 700) and the third element 222 of the first planetary gear set 22 is coupled to a second electric machine (e.g., second electric machine 22). A "0" denotes that either both or one of the engine is OFF and the first clutch 254 is activated, and the flow chart 300 reverts back to decision block 306. A "1" denotes that both the engine is ON and the first clutch 254 is deactivated, and the flow chart 300 proceeds to block 308.

Decision block 306 may additionally require a second clutch be deactivated. In an exemplary embodiment, the deactivated second clutch 252 decouples the first element 226 of the first planetary gear set 220 from a first element of the second planetary gear set 210. The second planetary gear set 210 includes the first element 216 coupled to the first electric machine (e.g., first electric machine 20), a second element 214 coupled to the second element 224 of the first planetary gear set 220 via rotating shaft 230 and a third element 212 coupled to the engine (e.g., engine 12).

Referring to block 308, a state of charge (SOC) of a high-voltage battery is monitored. In an exemplary embodiment, the SOC of the battery 36 is monitored. It will be appreciated that generation of electrical energy through the first electric machine for storage within the high-voltage battery (e.g., battery 36) is not provided upon presence of the deactivated first clutch 254 when the first element 226 of the first planetary gear set 220 is ungrounded. Accordingly, operating auxiliary loads supplied with electrical energy from the battery can deplete the battery SOC when the transmission is operating in the net zero output torque condition, without the transmission having the ability to charge the battery. Auxiliary loads can include, but are not limited to, an entertainment system, an infotainment system, and an air conditioning system of the vehicle.

Referring to decision block 310, a determination is made whether the monitored SOC of the battery is less than a first SOC threshold. A "0" denotes that the monitored SOC of the battery is not less than the first SOC threshold, and the flow chart 300 reverts back to decision block 310. A "1" denotes that the monitored SOC of the battery is less than the first SOC threshold, and the flow chart 300 proceeds to block 312.

Referring to block 312, a trickle-charging event is enabled by the hybrid control module 5 to enable generation of electrical energy through said first electric machine for storage within the high-voltage battery. It will be appreciated that enabling the trickle charging event eliminates or reduces the possibility of a shutdown of the powertrain system 610 when the battery SOC becomes too low, i.e., the battery SOC is less than the first SOC threshold.

Referring to block 314, enabling the trickle-charging event includes activating the first clutch coupled to the first planetary gear set. In an exemplary embodiment, when the first clutch 254 is activated, the first clutch 254 is configured to ground the first element 226 of the first planetary gear set 220. Referring to FIG. 2-3, the first clutch 254 includes a torque capacity that provides a reactive torque 248. Additionally, the second clutch 252 may remain deactivated allowing the first element 226 of the first planetary gear set to remain decoupled from the first element 216 of the second planetary gear set 210.

Referring to block 316, a second set (e.g., charging set) of torque commands between the engine, the first electric machine and the second electric machine are coordinated with the torque capacity of the activated first clutch to establish/maintain the net zero output torque condition. Furthermore, the second set of charging torque commands enable generation of electrical energy through said first electric machine for storage within the high-voltage battery upon presence of the activated first clutch. In one embodiment, with reference to FIG. 2-3, coordinating the torque capacity providing reactive torque 248 of the activated first clutch 254 with the second set of torque commands amongst the engine (e.g., engine 12) and the first and second electric machines (e.g., first and second electric machines 20, 22, respectively) includes commanding a positive engine torque 242, commanding a positive first motor torque 244 from the first electric machine and commanding a negative or reactive second motor torque 246 from the second electric machine. As aforementioned, the activated and grounded first clutch 254 provides the reactive torque 248 when the first clutch 254 is not slipping. Accordingly, the first clutch 254 includes a minimum torque capacity when activated, the minimum torque capacity associated with a minimum capacity that avoids slippage across the first clutch 254 when the second set of torque commands are applied. It will be appreciated that the sum of the engine torque 242, the first motor torque 244, the second motor torque 246 and the reactive torque 248 provided by the first clutch is equal to zero, and thus, provides a net zero output torque from the transmission output member (output member 626) to the driveline (e.g., driveline 700). In the illustrated embodiment of FIG. 2-3, the commanded engine torque 242 supports engine operation at a minimum engine speed associated with engine idle operation enabling generation of electrical energy through the first electric machine for storage within the battery 36. Accordingly, charging of the battery 36 is provided and a system shutdown can be avoided when the SOC of the battery becomes too low when one or more auxiliary loads are operated. Known hybrid powertrains fail to enable generation of electrical energy for storage within a high voltage battery, and instead, drain the high-voltage battery and a low-voltage battery (e.g., 12-volt battery) for power auxiliary components, and ultimately key-off the powertrain after an elapsed period of time.

As aforementioned, the configuration of the transmission 200 in the illustrated embodiment of FIG. 2-3 is only desirable when charging is required, i.e., the SOC of the high-voltage battery (e.g., battery 36) is less than the SOC threshold. In one embodiment, when the battery SOC is less than the first SOC threshold, the trickle-charging event is enabled and the configuration of the transmission 200 in the illustrated embodiment of FIG. 2-3 is utilized. The trickle-charging event is effective to charge the high-voltage battery during operation in neutral. Accordingly, when the SOC of the high-voltage battery is at least a second SOC threshold through charging of the high-voltage battery by the trickle-charging event, the trickle-charging event can be disabled. The second SOC threshold can include a higher magnitude than the first SOC threshold to allow the high-voltage battery to be depleted for some period of time before another charging event is required once the trickle-charging event is disabled. Alternatively, the first and second SOC thresholds can be identical. When the trickle-charging event is disabled, the configuration of the transmission 200 in the illustrated embodiment of FIG. 2-3 is transitioned back to the exemplary configuration in the illustrated embodiment of FIG. 2-2 during operation in neutral since charging is no longer required. Accordingly, the first clutch 254 is deactivated and the non-charging set of torque commands between the engine and the first and second electric machines is coordinated/balanced to establish the net zero output torque condition.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A control module-implemented method for controlling a powertrain system comprising an internal combustion engine, a first electric machine, a second electric machine, a high-voltage battery and an electro-mechanical transmission operative to transmit torque to a driveline, the control module executing the following steps, comprising:
during operation of the transmission in neutral while the engine is on and a first clutch is deactivated, monitoring a state of charge (SOC) of the high-voltage battery configured to provide stored electrical power to the first electric machine, the second electric machine and at least one auxiliary load;
enabling a trickle-charging event only when the SOC of the high-voltage battery is less than a first SOC threshold, comprising:
activating the first clutch coupled to a first planetary gear set, the first planetary gear set comprising a first element, a second element, and a third element; and
coordinating a torque capacity of the activated first clutch and a charging set of torque commands between the engine, the first electric machine and the second electric machine, the charging set of torque commands comprising torque commands for each of the engine, the first electric machine and the second electric machine configured to establish a net zero output torque condition while enabling generation of electrical energy through the first electric machine.

2. The method of claim 1, further comprising:
deactivating a second clutch decoupling the first element of the first planetary gear set from a first element of a second planetary gear set, the second planetary gear set comprising the first element coupled to the first electric machine, a second element coupled to the second element of the first planetary gear set via a rotating shaft and a third element of the second planetary gear set coupled to the engine.

3. The method of claim 1 wherein the charging set of torque commands further enables generation of electrical energy through said first electric machine for storage within the high-voltage battery upon presence of the activated first clutch.

4. The method of claim 1 wherein the first clutch is a grounding clutch configured to ground the first element of the first planetary gear set when the first clutch is activated, the second element of the first planetary gear set is coupled to an output member that reacts with the driveline and the third element of the first planetary gear set is coupled to the second electric machine.

5. The method of claim 1 wherein the first clutch provides a reactive torque to assist in establishing the net zero output torque condition upon presence of the activated first clutch.

6. The method of claim 1 wherein generation of electrical energy through said first electric machine for storage within the high-voltage battery is not provided upon a presence of the deactivated first clutch prior to enabling the trickle-charging event during operation of the transmission in neutral.

7. The method of claim 1 wherein operation of the transmission in neutral is enabled in response to an operator input.

8. The method of claim 1 wherein coordinating the charging set of torque commands among the engine and said first and second electric machines to establish the net zero output torque condition comprises:
commanding a positive engine torque;
commanding a positive first motor torque from the first electric machine; and
commanding a negative second motor torque from the second electric machine.

9. The method of claim 8 wherein the commanded positive engine torque supports engine operation at a minimum engine speed associated with engine idle operation enabling generation of electrical energy through said first electric machine for storage within the high-voltage battery only upon presence of the activated first clutch.

10. The method of claim 1, further comprising:
disabling the trickle-charging event when the SOC of the high-voltage battery is at least a second SOC threshold, comprising:
deactivating the first clutch; and
coordinating a non-charging set of torque commands between the engine, the first electric machine and the second electric machine, the non-charging set of torque commands comprising torque commands for each of the engine, the first electric machine and the second electric machine configured to establish the net zero output torque condition while not enabling generation of electrical energy through the first electric machine.

11. The method of claim 10 wherein the second SOC threshold is equal to the first SOC threshold.

12. The method of claim 10 wherein the second SOC threshold is greater than the first SOC threshold.

13. A control-module implemented method for controlling a powertrain system of a vehicle comprising an internal combustion engine, first and second electric machines, a high-voltage battery, an electro-mechanical transmission comprising at least a first and a second planetary gear set configured to transmit torque to a driveline, the control module configured to execute the following steps, comprising:
in response to an operator input selecting neutral operation of the transmission, operating the transmission in neutral without mechanically decoupling the transmission from the driveline comprising:
commanding a net zero output torque from the transmission to the driveline based on balancing a first set of torque commands among each of the engine and the first and second electric machines;
deactivating a first clutch to unground a first element of the first planetary gear set, the first planetary gear set comprising the first element, a second element, and a third element;
deactivating a second clutch decoupling the first element of the first planetary gear set from a first element of the second planetary gear set, the second planetary gear set comprising the first element, a second element and a third element of the second planetary gear set coupled to the engine; and
when a state of charge of the high-voltage battery configured to provide stored electrical power to the first electric machine, the second electric machine and at least one auxiliary load is less than a SOC threshold, enabling a trickle-charging event comprising:
activating the first clutch to ground the first element of the first planetary gear set, and
coordinating a torque capacity of the activated first clutch and a second set of torque commands among each of the engine, the first electric machine and the second electric machine to maintain the net zero output torque from the transmission to the driveline.

14. The method of claim 13 wherein the second set of torque commands further enable generation of electrical energy through said first electric machine for storage within the high-voltage battery upon a presence of the activated first clutch.

15. The method of claim 13 wherein the first set of torque commands do not enable generation of electrical energy through said first electric machine for storage within the high-voltage battery upon a presence of the deactivated first clutch.

16. The method of claim 13 wherein the second clutch remains deactivated during the trickle-charging event.

17. The method of claim 13 wherein the first clutch provides a reactive torque to assist in maintaining the net zero output torque from the transmission to the driveline upon presence of the activated first clutch and the first set of torque commands among the engine and said first electric machine comprises:
commanding a positive engine torque;
commanding a positive first motor torque from the first electric machine; and
commanding a negative second motor torque form the second electric machine.

18. The method of claim 17 wherein the commanded positive engine torque supports engine operation at a minimum engine speed associated with engine idle operation enabling generation of electrical energy through said first electric machine for storage within the high-voltage battery only upon presence of the activated first clutch.

19. Apparatus for controlling neutral operation in a powertrain system of a vehicle, the apparatus comprising:
an internal combustion engine;
first and second electric machines;
a high-voltage battery configured to supply electrical power to the first and second electric machines and at least one auxiliary load;
an electro-mechanical transmission mechanically-operatively coupled to the internal combustion engine and the first and second electric machines, the electro-mechanical transmission adapted to selectively transmit mechanical power to an output member that reacts with a driveline;
a control module configured to enable a trickle-charging event only when a state of charge (SOC) of the high-voltage battery is less than a SOC threshold during operation of the transmission in neutral while the engine is ON, comprising:
activating a first clutch coupled to a first planetary gear set, the first planetary gear set comprising a first element, a second element, and a third element, and
coordinating a torque capacity of the activated first clutch and charging torque commands between the engine, the first electric machine and the second electric machine to establish a net zero output torque condition.

20. The apparatus of claim 19, further comprising:
a second clutch deactivated and decoupling the first element of the first planetary gear set from a second element of a second planetary gear set;
the second element of the first planetary gear set coupled to the output member and to the second element of the second planetary gear set;
the engine coupled to a third element of the second planetary gear set;
the first electric machine coupled to a first element of the second planetary gear set; and
the second electric machine coupled to the third element of the first planetary gear set.

* * * * *